United States Patent [19]

Kurakake

[11] Patent Number: 4,587,607
[45] Date of Patent: May 6, 1986

[54] NUMERICAL CONTROL DEVICE

[75] Inventor: Mitsuo Kurakake, Hino, Japan

[73] Assignee: Fanuc Ltd., Minamitsuru, Japan

[21] Appl. No.: 705,055

[22] PCT Filed: Jul. 7, 1981

[86] PCT No.: PCT/JP81/00156
§ 371 Date: Mar. 5, 1982
§ 102(e) Date: Mar. 5, 1982

[87] PCT Pub. No.: WO82/00211
PCT Pub. Date: Jan. 21, 1982

Related U.S. Application Data

[63] Continuation of Ser. No. 355,725, Mar. 3, 1982, abandoned.

[30] Foreign Application Priority Data

Jul. 7, 1980 [JP] Japan .................. 55-92382

[51] Int. Cl.[4] .................. G06F 15/46; G06F 15/16
[52] U.S. Cl. .................. 364/167; 364/132; 364/474
[58] Field of Search .................. 364/184-187, 364/167-171, 131-137, 474, 475; 318/562-565; 371/8, 9, 11

[56] References Cited

U.S. PATENT DOCUMENTS 3,626,385 12/1971 Bouman .................. 318/562 X
4,058,711 11/1977 Ondercin et al. .................. 364/133
4,118,771 10/1978 Pomella et al. .................. 364/134
4,149,235 4/1979 Froyd et al. .................. 364/474
4,251,858 2/1981 Cambigue et al. .................. 364/186 X
4,288,849 9/1981 Yoshida et al. .................. 364/132
4,347,564 8/1982 Sugano et al. .................. 364/187 X

OTHER PUBLICATIONS

Moss—"Multiprocessing Adds Muscle to UPS"—Electronic Design, vol. 16, No. 11, May 24, 1978—pp. 238-243.
Hoffman et al—"Sinumerik Sprint 8T, A Manually Programmable Numerical Control for Lathes"—Siemens Power Engineering, vol. 1, No. 11, Nov. 1979, pp. 343-347.

Primary Examiner—Joseph Ruggiero
Attorney, Agent, or Firm—Staas & Halsey

[57] ABSTRACT

There are provided a plurality of standard numerical control devices having processors and being capable of processing data by virtue of the arithmetic functions of said processors. Each standard numerical control device or unit is provided with respective coupling circuits which function as interface circuits for exchanging data with the other standard numerical control device. One of the standard numerical control devices, which serves as a master, and the other standard numerical control device, which serves as the slave, are interconnected through the coupling circuits, with a single machine tool being numerically controlled by all of the standard numerical control devices under the overall control of the master.

3 Claims, 2 Drawing Figures

NUMERICAL CONTROL DEVICE

This is a continuation of application Ser. No. 355,725 filed on Mar. 3, 1982 abandoned.

BACKGROUND OF THE INVENTION

This invention relates to a numerical control device which is capable of controlling a machine tool having a large number of controlled axes, or a machine tool having two heads, by providing a plurality of standard numerical control devices each having data and numerical control processing capability using the arithmetic functions of their processors, one of the devices being a master device and the others being slave devices, and by connecting the master device to the slave devices through coupling circuits having a data exchange capability.

The numerical control of a machine tool which is required to be controlled in a complex manner, such as a machine tool having a large number of controlled axes or a lathe having two heads, is difficult to realize with a standard, mass-produced numerical control device because of its limited processing capability. Such control requires the use of a special-purpose numerical control device designed for a higher processing capability. The conventional special-purpose numerical control device of this kind, however, is designed and developed apart from standard numerical control devices and includes its own unique hardware and software. Production capacity therefore is small in scale so that the unit cost per device is quite high. Another disadvantage is that considerable time is required for delivery.

SUMMARY OF THE INVENTION

The present invention seeks to improve upon the disadvantages encountered in the prior art. An object of the present invention is to make possible a reduction in the price of the heretofore costly numerical control device of the aforementioned kind, as well as a reduction in the time needed for delivery, by utilizing standard, mass-produced numerical control devices to realize a special-purpose numerical control device which is capable of executing complex control operations or control of a large number of axes.

Specifically, in the present invention, a plurality of standard numerical control devices having a data processing capability using the arithmetic functions of their processors, are interconnected through coupling circuits which have a data exchange capability. With one of the numerical control devices serving as the master and the other numerical control devices serving as the slaves, a single machine tool is numerically controlled by the plurality of numerical control devices under the overall control of the master device. Thus, with the exception of the coupling circuits, the circuitry of the already mass-produced standard numerical control devices can be utilized intact, enabling a special-purpose numerical control device, which is capable of executing complex control operations or control of a large number of axes, to be provided at a low price and within a short delivery time.

DESCRIPTION OF THE PREFERRED EMBODIMENTS

The present invention will now be described in greater detail in conjunction with the accompanying drawings.

Figure 1:
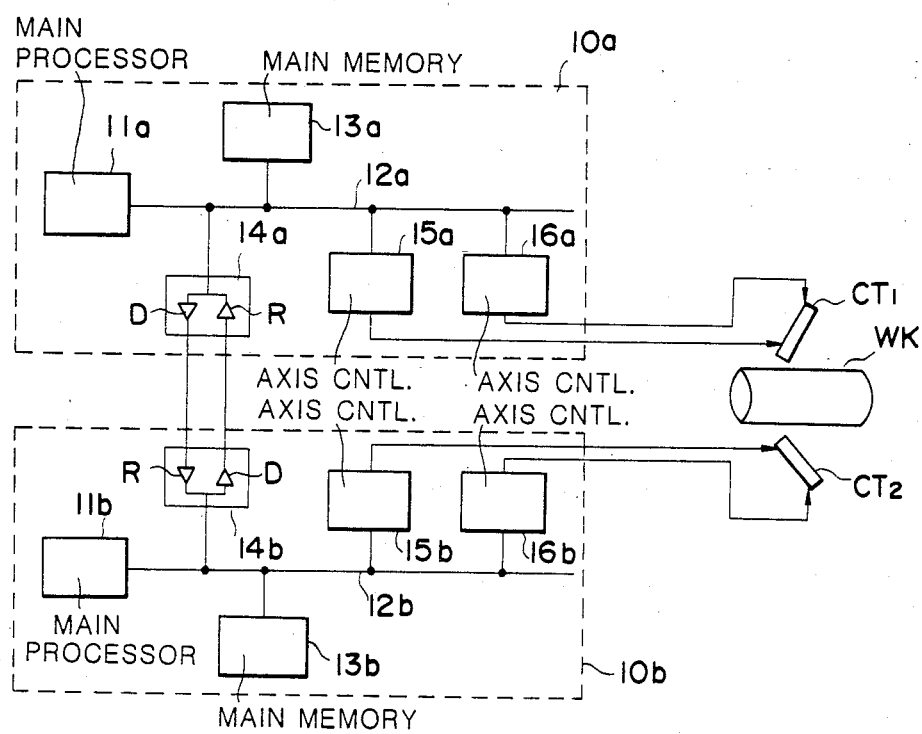
FIGS. 1 and 2 are block diagrams of the principal portions of different embodiments according to the present invention.

FIG. 1 is a block diagram of the principal portions of a numerical control device or unit embodying the present invention, in which numerals $10a$ and $10b$ denote standard numerical control devices and $11a$, $11b$ denote main processors and $12a$, $12b$ denote buses, $14a$ and $14b$ denote coupling circuits, and $15a$, $15b$, $16a$ and $16b$ denote axis control circuits. WK represents a workpiece, and $CT_1$ and $CT_2$ represent cutters. Each coupling circuit $14a$ and $14b$ includes a driver D for transmission and a receiver R for reception, these being capable of providing an electrical connection to the buses $12a$ and $12b$.

In FIG. 1, the standard numerical control device $10a$ is capable of carrying out ordinary numerical control independently by using the arithmetic functions of its main processor $11a$ to process an execution program and data stored in main memory $13a$. Likewise, the numerical control device $10b$ also is capable of carrying out ordinary numerical control independently by using the arithmetic functions of its main processor $11b$ to process the execution program and data stored in the main memory $13b$. The device of this embodiment is to be arranged as a special-purpose numerical control device for a two-headed lathe, using the two standard numerical control devices $10a$ and $10b$ of the type above-described. To this end the buses $12a$ and $12b$ are provided with the respective coupling circuits $14a$ and $14b$ which are interconnected by cables or the like. The coupling circuits $14a$ and $14b$ serve as interface circuits with respect to the system of the other processor and, in the case of this embodiment, are so constructed as to be capable of directly accessing the main memories $13a$ and $13b$ in the other of the standard numerical control devices $10a$ and $10b$ by means of a program mode which uses a read/write instruction, or a DMA (direct memory access) mode. With such an arrangement it is possible to transmit data between the two standard numerical control devices $10a$ and $10b$. Further, the axis control circuits $15a$ and $16a$ in the standard numerical control device $10a$ drivably control one cutter $CT_1$, and the axis control circuits $15b$ and $16b$ in the standard numerical control device $10b$ drivably control the other cutter $CT_2$.

In an actual numerical control operation one of the standard numerical control devices, for example the standard numerical control device $10a$, serves as a master, while the other standard numerical control device, namely $10b$, serves as a slave. The standard numerical control device $10a$ controls the cutter $CT_1$ as well as the overall system, and the standard numerical control device $10b$ controls the other cutter $CT_2$. In this case synchronization between the two devices is established by exchanging the information required on the master and slave sides. As information to be exchanged the master may send the slave such information as a start command, stop command, the amount of travel, the feed speed, etc., and the slave may send the master such information as a halt request due to an alarm, an operation completion signal, and the like. Such information is transmitted using the coupling circuits $14a$ and $14b$.

Thus the device of the present embodiment constitutes a single special-purpose numerical control device obtained by interconnecting two standard numerical control devices 10a and 10b in such a manner that they can exchange data with each other. This permits a mass-produced standard numerical control device or unit of an ordinary construction to be utilized intact, without the provision of unique hardware and software as in a conventional special-purpose numerical control device. Consequently, a market can be supplied with an inexpensive special-purpose numerical control device in a short delivery time.

Figure 2:
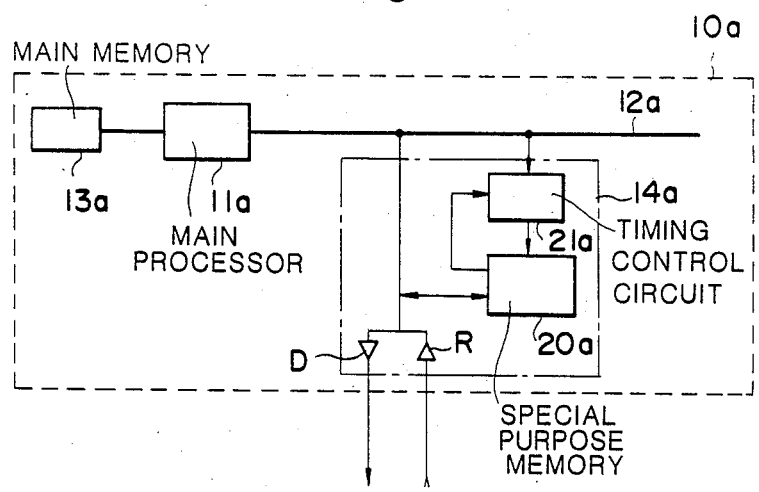

FIG. 2 is a block diagram of the principal portions of a numerical control device illustrative of another embodiment of the present invention, in which portions indentical with those of FIG. 1 are denoted by like reference characters. Numeral 20a denotes a special-purpose memory for data transfer, and 21a a timing control circuit. The device according to this embodiment is so arranged that the special-purpose memory 20a for data transfer, which memory is accessable by both the main processor 11a of the numerical control device 10a and that of the other numerical control device (not shown), is provided within the coupling circuit 14a. The transmission of data between the master and slave is carried out through the special-purpose memory 20a, without there being any direct access to the main memory of the companion numerical control device. Accordingly, the access of the main processor to its main memory is not interrupted by a data transfer, so that a improvement in efficiency is achieved. Further, the other numerical control device may access the special-purpose memory 20a by adopting a program mode or DMA mode.

It should be noted that the present invention is not limited to the foregoing embodiments but can be modified in a variety of ways.

Thus, as set forth hereinabove, the present invention may be applied to the control of machine tools that require control in a complex fashion, such as a machine tool having a large number of controlled axes, or a lathe having two heads.

What we claim is:

1. A numerical control device for controlling a machine tool having first and second controllable tools, said device comprising:
master numerical control means, operatively connected to the machine tool, for numerically controlling the first controllable tool, said master numerical control means comprising:
first processor means for generating numerical control commands;
first axis control means operatively, connected to said first processor means and the first controllable tool of the machine tool, for controlling the first controllable tool; and
first coupling means, operatively connected to said first processor means, for transmitting numerical control information; and
slave numerical control means, operatively connected to said first coupling means of said master numerical control means and the machine tool, for receiving the numerical control information and numerically controlling the second controllable tool and being controlled by said master numerical control means, said slave numerical control means comprising:
second processor means for generating numerical control commands;
second axis control means, operatively connected to said second processor means and the second controllable tool of the machine tool, for controlling the second controllable tool; and
second coupling means, operatively connected to said second processor means and said first coupling means, for transmitting the numerical control information between said slave and master numerical control means.

2. A numerical control device according to claim 1, wherein said first and second coupling means each comprise:
a receiver operatively connected to the associated one of the first and second processor means and the nonassociated one of said first and second coupling means; and
a driver operatively connected to the associated processor means and the nonassociated one of said first and second coupling means.

3. A numerical control device according to claim 2, wherein said first and second processor each have a processing memory and said coupling means each further comprises:
a timing control circuit operatively connected to the associated one of said first and second processor means; and
a communication memory operatively connected to said timing control means, said receiver and said driver and the associated one of said first and second processor means.

* * * * *

UNITED STATES PATENT AND TRADEMARK OFFICE
CERTIFICATE OF CORRECTION

PATENT NO. : 4,587,607
DATED : May 6, 1986
INVENTOR(S) : Mitsuo Kurakake

It is certified that error appears in the above-identified patent and that said Letters Patent is hereby corrected as shown below:

Front page, Related U.S. Application Data [63], line 1, "Mar. 3, 1982," should be --Mar. 5, 1982,--.

Column 1, line 5, "Mar. 3, 1982" should be --Mar. 5, 1982--.

Column 3, line 14, "indentical" should be --identical--.

Signed and Sealed this

Twenty-sixth Day of August 1986

[SEAL]

Attest:

Attesting Officer

DONALD J. QUIGG

Commissioner of Patents and Trademarks